United States Patent [19]

Gabus

[11] Patent Number: 4,660,869
[45] Date of Patent: Apr. 28, 1987

[54] CONNECTION FOR PIPES

[76] Inventor: Charles Gabus, 1290 Versoix, Geneva, Switzerland

[21] Appl. No.: 807,652
[22] PCT Filed: Apr. 15, 1985
[86] PCT No.: PCT/EP85/00164
§ 371 Date: Nov. 26, 1985
§ 102(e) Date: Nov. 26, 1985
[87] PCT Pub. No.: WO85/04940
PCT Pub. Date: Nov. 7, 1985

[30] Foreign Application Priority Data

Apr. 19, 1984 [CH] Switzerland ............. 1974/84

[51] Int. Cl.$^4$ .................................. F16L 23/04
[52] U.S. Cl. ........................ 285/365; 285/351; 285/407; 285/409; 285/331
[58] Field of Search ............... 285/365, 407, 409, 331, 285/332.2, 351

[56] References Cited

U.S. PATENT DOCUMENTS

| | | | |
|---|---|---|---|
| 2,330,864 | 10/1943 | Bruno | 285/332.2 |
| 2,463,196 | 3/1949 | Parker | 285/332.2 |
| 2,818,282 | 12/1957 | Herman . | |
| 3,214,202 | 10/1965 | Maychark . | |
| 3,966,240 | 6/1976 | Michitoshi . | |

FOREIGN PATENT DOCUMENTS

| | | | |
|---|---|---|---|
| 507903 | 5/1953 | Belgium | 285/365 |
| 841251 | 6/1952 | Fed. Rep. of Germany . | |
| 1021311 | 12/1957 | Fed. Rep. of Germany | 285/365 |
| 1600403 | 1/1970 | Fed. Rep. of Germany . | |
| 2359417 | 6/1975 | Fed. Rep. of Germany . | |
| 615988 | 2/1980 | Switzerland | 285/365 |

OTHER PUBLICATIONS

"Rapidly Detachable Joint for Main Liquid Nitrogen Lines", B. M. Kaporowski et al., Instruments & Experimental Techniques, vol. 14, Jul. 1971, p. 300.

Primary Examiner—Richard J. Scanlan, Jr.
Attorney, Agent, or Firm—Anthony A. O'Brien

[57] ABSTRACT

The connection consists of two tubular pieces (1 and 2) clamped end to end against each other by means of a clamp collar the jaws of which (8 and 9) engage with conical slopes (5 and 6) of the connection pieces. Sealing is obtained by the close metal to metal contact of a support surface (17) with its opposite part. A gasket (19) ensures a safety seal in case the contact (17) with the opposite part is not completely sealed.

6 Claims, 3 Drawing Figures

CONNECTION FOR PIPES

Pipe connections are known comprising two tubular pieces each intended to be mounted on the end of a pipe and each providing a flange, each flange providing a conical slope on the side of the respective pipe, the connection comprising a clamp collar having a generally V-shaped groove intended to cover the flanges and to press the flanges against each other by engagement on their conical slopes.

The aim of the invention is to improve the reliability of connections of this type and to enable the achievement of perfect sealing both for liquids and for gases within a wide range of temperatures and of pressure or low pressure.

The connection forming the object of the invention is characterised in that one flange displays on its side facing the other flange an annular groove in which a gasket is fitted with play, this flange having an annular area of support the average radius of which is smaller than that of the groove, this area of support being formed to engage against another area of support of the other flange.

The attached drawing shows diagrammatically and as an example one form of operation of the object of the invention.

Figure 1:
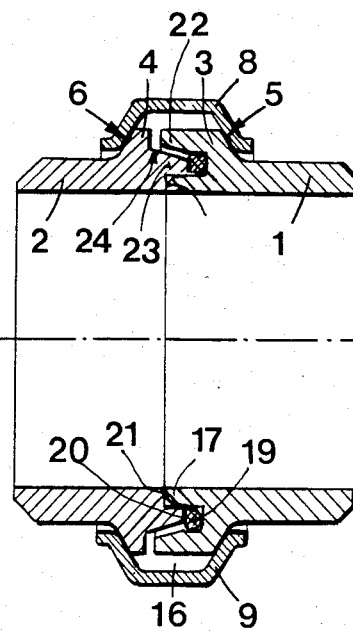
FIG. 1 is a view in axial section of the two tubular parts of the connection, in a connected position.

With reference to FIG. 1, the connection consists of two tubular pieces 1 and 2 each displaying a flange 3 and 4 respectively. Each of the tubular pieces is intended to be welded to (secured together with) the end of a pipe. Where the liquid passing through the link is a food substance or is a corrosive liquid, the pipes are generally made of stainless steel and it is obviously worth while forming the pieces 1 and 2 of this material as well. Each flange 3 and 4 has a conical slope, 5 and 6 respectively, at the side of the pipe to which it is attached.

The assembly of the two tubular pieces of the connection is ensured by a clamp collar 7, made up of two jaws 8 and 9 in a sheet of drop forged stainless steel. These jaws are articulated to each other by means of a connecting rod 10 connected with lugs which are welded (bound) to the jaws or are integral with the jaws. At their other end, these jaws are held tight with the help of a lever 11 fixed to the end of a connecting rod 12 which has a connecton 13 on the jaw 8, this lever 11 turning a cam-shaped section 14, so as to apply pressure to the end of the jaw 9 and bring the latter close to the jaw 8. The closed position of the lever 11 is retained by a spring clip 15.

The two jaws 8 and 9 each have a generally V-shaped groove 16 and are intended to cover the flanges 3 and 4 in order to hold them tightly against each other by engaging on their conical slopes 5 and 6 respectively.

Figure 2:
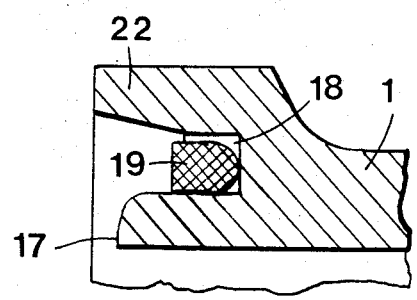
FIG. 2 shows a sectional view of one of the tubular pieces, in a disconnected position.
Figure 3:
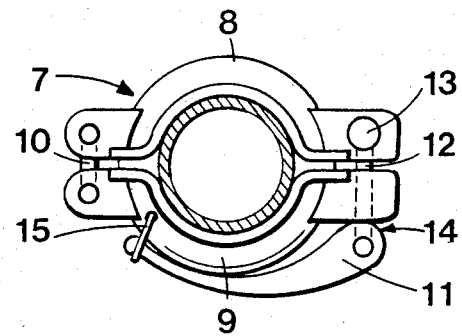
FIG. 3 is an end view of the connection fitted with its clamp collar.

As FIG. 2 shows, the tubular piece 1 has an annular support area 17 and an annular groove 18 in which a gasket 19 is fitted with play, the thickness of the gasket being less than the depth of the groove. Depending on the circumstances this gasket will be in metal, in conglomerate fibres or in elastomer.

The front face of the flange 4 displays an annular support area 20 which coacts with the joint 19, and a support area 21 engaging the surface 17. When in the state of not being held tightly it is necessary for sufficient play between the gasket 19 and the groove 18 to be provided so that when being held tightly the gasket can be bent elastically to enable close contact between the surfaces 17 and 21 and to ensure air- and watertightness.

The flange 3 presents an edge 22 surrounding the gasket 19 and the support area 17, this edge being intended to guide with play the front part 23 of the other flange when the two flanges of the connection are brought together. This part 23 has a periphery 24 shaped like a cone in order to facilitate its insertion into the spaced defined by the edge 22 and to ensure the centering of the two annular pieces.

The support area 17 is small so that clamping by the clamp collar 7 enables a specific high support pressure to be obtained between the two tubular pieces, which is enough to ensure perfect sealing. The gasket 19 is provided by way of safety in a case, where as a consequence of careless assembly a foreign body is caught between these metal support areas.

It will be seen that the support area 20 which is intended to coact with the gasket 19 projects in relation to the support area 21 which has a smaller radius and thus forms a protection avoiding practically all damage to the surface 21 from impacts against outside objects.

I claim:

1. Pipe connection, comprising two tubular pieces each intended to be provided on the end of a pipe and each providing a flange, each flange having a conical slope on the side of the respective pipe, the connection comprising a clamp collar having a generally V-shaped groove and intended to cover the flanges and to hold them tightly against each other by engagement on their conical slopes, a first one of said flanges having on its side facing a second one of said flanges, an annular groove for lodging a gasket characterised in that said first flange has an annular support area which is contained in a plane perpendicular to the axis of the respective tubular piece and the average radius of which is smaller than that of the groove, and said second flange has an annular support area, the support area of said first flange being adapted to fit against said support area of said second flange so as to ensure perfect sealing.

2. A connection according to claim 1, wherein said second flange has a second support area for projecting into said groove in sealing engagement with said gasket.

3. A connection according to claim 2, wherein the thickness of said gasket is less than the depth of the annular groove, and said second support area of said second flange coacts with said gasket and is in projecting relation to the support area of said first flange so as to be able to enter the groove in order to engage with said gasket.

4. A connection according to claim 2, wherein said first flange presents an edge turned towards said second flange to form a space for receiving said second support area of said second flange, said edge surrounding said support areas.

5. A connection according to claim 4, wherein said second support area of said second flange fits into said space and has a periphery shaped like a flattened cone serving to facilitate the centering of one of said flanges in relation to the other of said flanges.

6. A pipe connection for joining two tubular pieces along a longitudinal axis, comprising:

first and second flanges connected respectively to the two tubular pieces in facing relation, each said flange having an outer conical sloped portion sloping away from the pipe connection;

a clamp collar having a generally V-shaped groove for covering and engaging each of said conical sloped portions whereby said flanges are held tightly together in facing relation by said clamp collar;

said first flange having an annular groove opening toward said second flange for receiving an annular gasket having a predetermined thickness and a first annular support area that is contained in a plane perpendicular to the longitudinal axis of the tubular pieces, the maximum radius with respect to the longitudinal axis of said first support area being equal to the minimum diameter of said groove;

said second flange having a second annular support area facing said first annular support area such that said first and said second support areas are held lightly together by said clamp collar for sealing the pipe connection;

said second flange further having a third projecting annular support area extending longitudinally in projecting relation to said second support area for projecting into said groove in sealing engagement with said gasket; and said first flange further having an edge portion facing said second flange and extending radially outwardly from said groove for receiving said third annular support area, said third annular support area having an upper frusto-conical peripheral portion adapted for engagement with said edge portion during the initial alignment of said flanges.

* * * * *